United States Patent
Piet et al.

(10) Patent No.: US 8,943,353 B2
(45) Date of Patent: Jan. 27, 2015

(54) ASSIGNING NODES TO JOBS BASED ON RELIABILITY FACTORS

(71) Applicant: Hewlett-Packard Development Company, L.P., Houston, TX (US)

(72) Inventors: Peter Piet, Orinda, CA (US); Robert Schreiber, Palo Alto, CA (US); Helen W. Cheung, Cupertino, CA (US); Timothy F. Forell, Los Altos, CA (US); Moray McLaren, Bristol (GB); Dejan S. Milojicic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 128 days.

(21) Appl. No.: 13/756,155

(22) Filed: Jan. 31, 2013

(65) Prior Publication Data

US 2014/0215481 A1    Jul. 31, 2014

(51) Int. Cl.
*G06F 9/50* (2006.01)

(52) U.S. Cl.
CPC .................................. *G06F 9/5011* (2013.01)
USPC .......................................................... 714/2

(58) Field of Classification Search
CPC ..... G06F 9/5011; G06F 9/5027; G06F 11/00; G06F 11/0793; G06F 11/3442; G06F 9/5022; G06F 9/524; G06F 11/1402; G06F 11/3055; G06F 11/724; G06F 11/0772; G06F 11/14
See application file for complete search history.

(56) References Cited

U.S. PATENT DOCUMENTS

| | | | |
|---|---|---|---|
| 7,827,435 B2 * | 11/2010 | Sahoo et al. | 714/4.1 |
| 8,074,222 B2 * | 12/2011 | Hirai | 718/102 |
| 8,209,395 B2 | 6/2012 | Richoux et al. | |
| 8,615,677 B2 * | 12/2013 | Barsness et al. | 714/4.11 |
| 8,645,745 B2 * | 2/2014 | Barsness et al. | 714/4.11 |
| 2004/0194060 A1 * | 9/2004 | Ousterhout et al. | 717/120 |
| 2007/0180288 A1 | 8/2007 | Okada et al. | |
| 2009/0172168 A1 * | 7/2009 | Sonoda et al. | 709/226 |
| 2014/0189706 A1 * | 7/2014 | Baek et al. | 718/104 |
| 2014/0215481 A1 * | 7/2014 | Piet et al. | 718/104 |

OTHER PUBLICATIONS

Li, Y. et al.; "Fault-driven Re-scheduling for Improving System-level Fault Resilience"; Sep. 10-14, 2007; http://ieeexplore.ieee.org/xpl/articleDetails.jsp?reload+true&tp+&arnu.

Raju. N. et al.; "Reliability Analysis in HPC Clusters"; http://xcr.cenit.latech.edu/hapcw2006/program/papers/hapcw_rel_analysis.pdf.

* cited by examiner

*Primary Examiner* — Nadeem Iqbal
(74) *Attorney, Agent, or Firm* — Van Cott, Bagley, Cornwall and McClelland; Steven Nichols

(57) ABSTRACT

Assigning nodes to jobs based on reliability factors includes calculating the maximum value of a processor utilization efficiency and assigning an optimal number of spare nodes to the job based on the value of the processor utilization efficiency.

15 Claims, 4 Drawing Sheets

ASSIGNING NODES TO JOBS BASED ON RELIABILITY FACTORS

BACKGROUND

A High Performance Computing (HPC) system uses a number of nodes to access, process, and store large amounts of data in a distributed network environment. A HPC system uses a job scheduler to manage and distribute jobs, such as computer applications, across multiple nodes, central processing units, network links, disk drives, or other resource. This allows the job to achieve optimal resource utilization, minimized response time, maximum throughput, and to avoid overloading any single node. By distributing jobs across multiple nodes, the HPC system operates as a single system to access, process, and store large amounts of data at a high processing rate.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
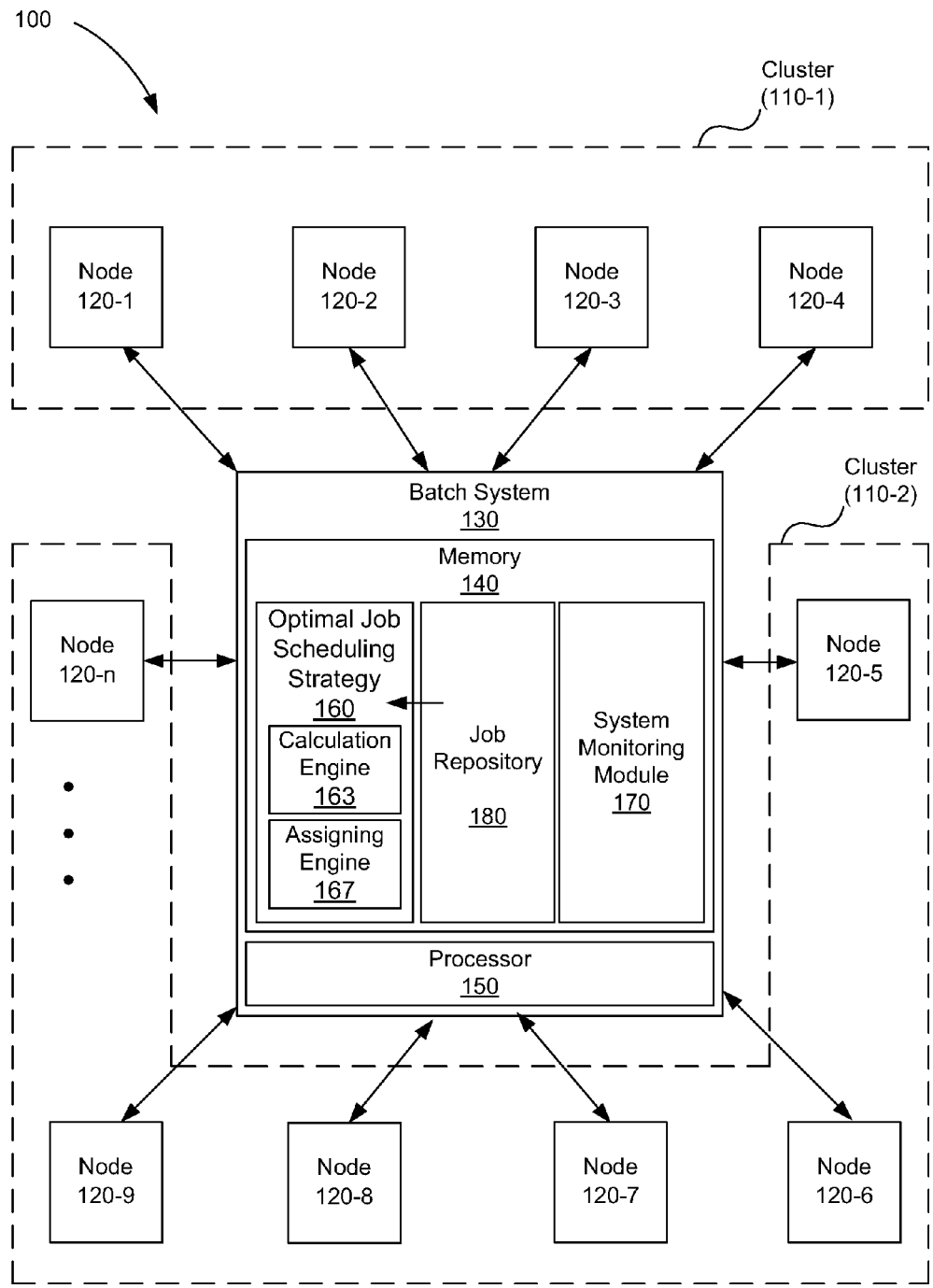
FIG. 1 is a diagram of an example of a high performance computing system, according to the principles described herein.

With the increased scale and lower power requirements of HPC systems, there is an increasing chance that some of the nodes will fail while executing a number of jobs. With the increasing probability of node failure, the progress of jobs in the HPC system will be impacted. This impact leads to lower utilization of the HPC system's resources and delays in processing jobs.

To increase the progress of jobs in a HPC system, the HPC system may use performance driven job schedulers. A performance driven job scheduler uses a number of methods to schedule a number of jobs. For example, a performance driven job scheduler may use methods such as, first in first out (FIFO) and highest priority first. These methods are used to distribute a number of jobs across multiple computer nodes, central processing units, network links, disk drives, other resources, or combinations thereof.

Using a FIFO method for a performance driven job scheduler, each job received by the performance driven job scheduler is executed in the order the job was received. For example, assume three jobs are received by the performance driven job scheduler, namely, job 1, job 2, and job 3. Using the FIFO method, job 1 is executed first, job 2 is executed second, and job 3 is the last job to be executed. Further, assume the HPC system's resources can execute job 1 and job 3 at the same time. However, using the FIFO method job 1 will execute on the HPC system, then job 2, and finally job 3. Consequently, job 1 and job 3 cannot execute at the same time. Thus, using a FIFO method for a performance driven job scheduler, the FIFO method leads to lower utilization of the HPC system's resources and delays in processing jobs.

Further, using a highest priority first method for a performance driven job scheduler, each job's priority is determined and executed by the performance driven job scheduler. Further, a job with the highest priority is executed first. For example, assume three jobs are received by the performance driven job scheduler, namely, job 1, job 2, and job 3. Assume job 1 has the highest priority and is to be executed first. Job 2 has the lowest priority and is to be executed last. Job 3 has a priority between job 1 and job 2, thus, job 3 is to be executed after job 1 and before job 2. Further assume, before job 2 is executed, a number of new jobs are received by the performance driven job scheduler. Further, the new jobs have a higher priority than job 2. Thus, the new jobs are executed before job 2. In one example, job 2 may never execute if new jobs with a higher priority than job 2 are received before job 2 is initiated.

Further, using the methods of performance driven job schedulers, the performance driven job schedulers does not take into account reliability factors of each of the underlying nodes where jobs will execute. If the HPC system uses an unreliable node for each job scheduled, the job may experience errors or crash. In such a case, the job executing on the failed node is lost and is reprocessed by another node. In the case of large jobs, reprocessing the job takes time, requires more nodes, and may delay the processing of other jobs if a node fails.

An alternative approach to a performance driven job scheduler uses checkpoints and restarts to improve the progress of jobs in the HPC system. Checkpoint is a technique for inserting fault tolerances into an HPC system that helps tolerate errors, such as node failure, that lead to losing the work of long-running jobs. The checkpoint technique preserves system consistency in case of a node failure. For example, a checkpoint is inserted after a specified interval of time, periodically or after a specified event by writing the HPC system's current state, or data, into memory. The HPC system's current state may be saved in memory either locally, in stable storage, or in a distant node's memory. Thus, checkpoint is the process of writing an HPC system's current state, or data, into memory. Further, the checkpoint can be read from memory even after a subsequent failure happens, such as a node failure.

There are many different techniques and methods for creating a checkpoint. In one example, a checkpoint considers the amount of state saved. In one example, a state may include contents of an HPC's current application data such as the contents of registers or physical memory in the HPC system. Further, the amount of state saved may range from storing all the application's data to selecting specific relevant cores of data in order to create a checkpoint. Further, a checkpoint may consider whether or not the saved state can be used on different machines or operating systems to restart an application. Finally, a checkpoint may consider how the checkpoint technique is implemented. For example, a checkpoint may be implemented inside a library, by the compiler, at the operating system level, another component, or combinations thereof.

As mentioned above, checkpoints are used to save the current state of an HPC system. Further, the checkpoint can be read from memory even after a subsequent failure happens, such as a node failure. If a node failure occurs, the job executing on the node stops. Thus, the progress of jobs in the HPC system will be impacted. In order for the job to progress, the failed node is restarted. When the failed node is restarted, the failed node reads the data stored in the last of the periodic checkpoints. Thus, the failed node has recovered and resumes executing the job from the point at which that checkpoint was inserted. Thus, the work done on the job, before the checkpoint, is not reprocessed. Consequently, the work done on the job between taking the checkpoint and the node failure is lost. Thus, restarts are used to restore the state of an HPC system, to where the checkpoint was inserted, in the event of node failure. The combination of the process of checkpoint and restart may be referred to as checkpoint-restart.

Despite the advantages of checkpoint-restart, each checkpoint consideration affects the properties and efficiency of the checkpoint. For example, a checkpoint that stores the entire application's state will allow for a more straightforward implementation, since no analysis of the application will be desired. However, if a checkpoint is used on different machines or operating systems, the generated state of each component of the HPC system may not be compatible with other parts of the HPC system. This can lead to a number of errors within the HPC system. Further, checkpoints made by different processes still may not form a consistent state. The desire for establishing a consistent state in the event of node failure may force other processes to roll back to their checkpoints. In one example, this causes other processes to roll back to even earlier checkpoints. Further, in the most extreme cases, just the consistent state found is the initial state. Thus, a HPC system may regress to its initial state in the extreme case of node failure.

Additionally, checkpoints are independent of job scheduling. Since checkpoints are independent of job scheduling, checkpoints can be inserted at anytime in the HPC system. In one example, a checkpoint is inserted during the execution of a job. The job executing on the HPC system will stop in order for the checkpoint to be inserted into the HPC system. This leads to lower utilization of the HPC system's resources and delays job processing. Taking checkpoints too frequently results in less work of the job executing being lost. Consequently, more time is spent writing checkpoints and results in lower utilization of the HPC system's resources and delays job processing. Alternatively, taking checkpoints infrequently results in higher utilization of the HPC system's resources, since less time is spent writing checkpoints. However, taking checkpoints infrequently results in losing larger portions of a job executing if a node fails. Further, a checkpoint does not take into account reliability factors of each of the underlying nodes where jobs are executed. Thus, if a node fails, part or the entire job is lost depending on when a checkpoint was inserted.

An alternative approach to inserting checkpoints and restarting a failed node is a sparing node strategy. As mentioned above, if a node fails, part or the entire job may be lost unless a spare node is available. Thus, a sparing node strategy allocates spare nodes in a HPC system to execute a job if a node fails. In one example, a sparing node strategy allocates one spare node for every node used for executing a job. Thus, if a node fails, a spare node is used to resume execution of the job. Despite the advantages of sparing node strategy, a sparing node strategy leads to lower utilization of the HPC system's resources and delays in processing a job if too many spare nodes are used. In another example, if too few spare nodes allocated to a job and a node fails during job execution, a spare node may not be available. If a spare node is not available for executing the job, the job cannot continue to execute. Thus, part or the entire job is lost.

The principles described herein include systems and methods for an optimal job scheduling strategy given reliability factors. Thus, the optimal job scheduling strategy takes into account the reliability factors of each of the underlying nodes where jobs are executed, the number of spare nodes allocated to the job, the size of the job, and the recovery characteristics of the HPC system rather than by merely scheduling a job without reliability factors being explicitly considered.

As mentioned above, a HPC system uses a number of nodes to access, process, and store large amounts of data in a distributed network environment. A HPC system uses a job scheduler, such as a batch system, to manage and distribute jobs, such as computer applications, across multiple nodes, central processing units, network links, disk drives, or other resource. This allows the job to achieve optimal resource utilization, minimized response time, maximum throughput, and to avoid overloading any single node. By distributing jobs across multiple nodes, the HPC system operates as a single system to access, process, and store large amounts of data at a high processing rate.

A batch system is used to coordinate incoming jobs for the HPC system. The batch system chooses jobs according to their priorities, making decisions about whether or not, and when, to admit a new job so as to maximize the expected throughput done given a number of reliability factors to consider. Further, the batch system uses an optimal job scheduling strategy to ensure the best trade-off between job execution forward progress, degree of spare node allocation, and prudent use of the total number of nodes assigned to the job.

The optimal job scheduling strategy is applied to each job in a series of arriving jobs. The optimal job scheduling strategy maximizes the expected throughput of jobs based on a number of reliability factors. Further, throughput estimates can be based on a number of reliability estimates for system components where jobs are executed, such as nodes. These reliability estimates are later used as reliability factors for the optimal job scheduling strategy.

Further, reliability estimates can be adjusted based on a system monitoring module. The system monitoring module monitors the health of individual nodes, and other system components. The system monitoring module tracks parameters for each node and other system components to determine the estimated failure probabilities of nodes as well as other system components. The optimal job scheduling strategy uses these estimated failure probabilities as reliability factors when scheduling a job.

As mentioned above, each job uses a number of nodes for executing a job. Further, a node that is used for executing a job is referred to as a compute node. As will be described in the specification, the optimal job scheduling strategy takes into account the size of each job, to determine the number of compute nodes desired for each job. In one example, a batch system is used to determine the size of each job based a number of factors. In keeping with the given example, jobs having longer execution times may use more compute nodes to reduce the execution time of the job. Alternatively, jobs having shorter execution times may use fewer compute nodes. Thus, the batch system may determine the size of a job based on an execution time of the job. In another example, the complexity of a job may determine the number of compute nodes for the job. For example, complex jobs may use more compute nodes than a simple job. Thus, the batch system may determine the size of a job based on the complexity of the job. In yet another example, job policy may determine the number of compute nodes used for each job. For example, jobs using only a few compute nodes may execute at the same time on an HPC system. Alternatively, jobs using a large amount of compute nodes may execute one at a time. Thus, the batch system may determine the size of a job based on a job policy. Further, any other appropriate combination of factors may be used to determine the number of compute nodes assigned to a job. Thus, the optimal job scheduling strategy allocates the number of compute nodes desired for executing a job depending on the size of the job. Further, the optimal job scheduling strategy takes into account the reliability of each of the underlying nodes where jobs are executed.

If an HPC's compute node fails, the job may crash, which will lose all work done by the compute node to that point, unless a spare node is provided. Thus, each job uses a number of spare nodes to avoid work loss in the event of a compute node failure. If a compute node fails, a spare node continues to execute the job. However, if too many spare nodes are allocated for each job, the overall throughput of the HPC system is affected. To ensure the overall throughput of the HPC system is not affected, the batch system maintains an adequate number of spare nodes to protect the investment in the jobs currently executing on the compute nodes. To calculate the optimal number of spare nodes for each job, the optimal job scheduling strategy estimates the probability of job success using a calibrated, rational mathematical model of the likelihood that the number of compute nodes will fail before a job finishes. In one example, the optimal job scheduling strategy calculates if the number of compute nodes that fail before a job finishes will be less than or equal to the number of spare nodes available to the job. Further, the optimal job scheduling strategy is sensitive to the fact that spare nodes do not contribute to the throughput. Thus, just the optimal number of spare nodes is allocated to each job given reliability factors to maximize throughput.

Thus, in order to determine the optimal job scheduling strategy, first, a request is received to schedule a job that requires a number of nodes. Each arriving job is optimally assigned to a number of nodes or cluster by allocating a number of compute nodes. Further, the compute nodes are used to execute the job.

Next, an average time for a checkpoint-restart after a primary node failure is calculated. Further, a primary node is an underlying node where a job will execute. As will be described below, a checkpoint-restart is used to determine the recovery characteristics of the node. Further, a checkpoint is used to preserve the system's consistency in case of node failure. If a node fails, the state of the failed node may be restarted to the state where the checkpoint was inserted into the failed node.

Next, an optimal checkpoint interval and an average forward progress ratio (AFPR) are calculated. The optimal checkpoint interval is used to determine when a checkpoint is to be inserted into the HPC system to maximize the AFPR. The AFPR is a measure of throughput and is used as a reliability factor for each job as well as other system components as will be described below.

Next, a probability that a spare node will be available when desired is calculated. An adequate pool of spare nodes is maintained to protect the investment in the jobs already executing on the HPC system. If a compute node fails, a spare node is used to resume the job. The probability that a spare node will be available when desired is a measure of throughput and is used as another reliability factor as will be described below.

Next, a maximum value of a processor utilization efficiency (PUE) is calculated. The PUE is the overall measure of throughput for each job using a number of compute nodes and is also used as a reliability factor as will be described below. Thus, the throughput estimates can be rationally made using a model of failure probabilities to predict the chance that a job will run out of compute nodes given its size, its expected execution time, the number of spare nodes available, other chances, or combinations thereof.

Finally, an optimal number of spare nodes are assigned to the job based on these reliability factors. Given these reliability factors, an overall measure of optimality ensures the best trade-off between job execution forward progress, degree of spare node allocation, and prudent use of the total number of nodes assigned to the job.

Thus, each arriving job is optimally assigned to a number of nodes by allocating a number of compute nodes and a number of spare nodes. The optimal job scheduling strategy then allocates these nodes efficiently and accepts additional jobs as long as the currently allocated jobs would not be put at risk to ensure maximum throughput even in the event of node failure.

Thus, the optimal job scheduling strategy uses reliability factors to schedule each job. By using reliability factors, a job is less likely to fail by having adequate resources such as spare nodes if a compute node fails. Thus, the utilization of the HPC system's resources for job scheduling is optimized.

A node may be a single stand alone processing device in a distributed network environment. In one example, a node is a computer. Further, the state of a node may be referred to as a compute node or a spare node. A compute node is used to execute a job. A spare node does not execute a job. However, spare nodes remain unused during the execution of a job unless the compute node fails. In such a case, the spare node continues to execute the job for the failed compute node.

A cluster is a number of nodes working together as a single system. Further, clusters are deployed to improve performance and availability over a single computing device. The nodes of a cluster are usually connected to each other through fast local area networks, where each node runs its own instance of an operating system.

A job is a computer application or program that is set up to run to completion without manual intervention. Thus, all the input data is preselected through scripts, command-line parameters, or job control language.

Job scheduling is a computer application that controls unattended background program execution. Further, basic job scheduling operations may include, defining workflows and job dependencies, automatic submission of executions, priorities and queue to control the execution order of unrelated jobs, and monitoring job executions. Job scheduling is mainly concerned with throughput, latency, response time, and sharing processor time. Often throughput, latency, response time, and sharing processor time conflict. Thus, job scheduling implements a suitable compromise. This compromise is often determined by a system's unique circumstances and objectives.

A method for assigning nodes to jobs based on factors will be described in more detail below. This can be done using a job scheduling device in a distributive network environment. The method then includes calculating a maximum value of a processor utilization efficiency and assigning an optimal number of spare nodes to a job based on the maximum value of the processor utilization efficiency.

Referring now to the figures, FIG. 1 is a diagram of an example of a high performance computing system, according to principles described herein. As noted above, a HPC system (100) uses a number of nodes (120) in a cluster (110) for a job to access, process, and store large amounts of data. As mentioned above, a HPC system (100) uses a batch system (130) to distribute jobs across multiple nodes (120), central processing units, network links, disk drives, or other resource. This allows the job to achieve optimal resource utilization, minimized response time, maximum throughput, and to avoid overloading any single node. By distributing jobs across multiple nodes (120), the HPC system (100) operates as a single entity to access, process, and store large amounts of data at a high performance rate.

As illustrated in FIG. 1, a batch system (130) is used to distribute jobs across a number of clusters (110-1, 110-2). Each cluster (110-1, 110-2) includes a number of nodes (120-1 to 120-4, 120-5, 120-n, respectively). For illustrative purposes, cluster 110-1 has fewer nodes than cluster 110-2 and is used to process smaller jobs. In practice, the number of nodes (120) within each cluster (110) may be the same or vary depending on the intended application. As noted above, each node (120-1 to 120-n) in the cluster (110) may be used as a compute node or a spare node as determined by the optimal job scheduling strategy (160).

A batch system (130) is used to coordinate incoming jobs for the HPC system (100). The batch system (130) chooses jobs according to their priorities, making decisions about whether or not, and when, to admit a new job to maximize the expected throughput done given reliability factors. Further, the batch system (130) stores incoming jobs in a job repository (180), located in the batch system's (130) memory (140), until the optimal job scheduling strategy (160) can process the job. Further, a job repository (180) may include a database, a server, or any storage element capable of storing a job.

As noted above, the optimal job scheduling strategy (160) is applied to each job in a series of arriving jobs. Each job uses a number of compute nodes for executing a job. The number of compute nodes desired for executing a job depends on the size of the job. To determine the size of each job, a number of factors are considered. In one example, a batch system (130) is used to determine the size of each job based a number of factors. In keeping with the given example, jobs having longer execution times may use more compute nodes to reduce the execution time of the job. Alternatively, jobs having shorter execution times may use fewer compute nodes. Thus, the batch system (130) may determine the size of a job based on an execution time of the job. In another example, the complexity of a job may determine the number of compute nodes for the job. For example, complex jobs may use more compute nodes than a simple job. Thus, the batch system (130) may determine the size of a job based on the complexity of the job. In yet another example, job policy may determine the number of compute nodes used for each job. For example, jobs using only a few compute nodes may execute at the same time on an HPC system. Alternatively, jobs using a large amount of compute nodes may execute one at a time. Thus, the batch system (130) may determine the size of a job based on a job policy. Further, any other appropriate combination of factors may be used to determine the number of compute nodes assigned to a job. Thus, the optimal job scheduling strategy (160) allocates the number of compute nodes desired for executing a job depending on the size of the job. The optimal job scheduling strategy (160) process can be done using the examples detailed in FIGS. 2 and 3 described later in this specification.

As mentioned above, each job uses a number of spare nodes to prevent a loss in the event that a compute node fails. The batch system (130) maintains an adequate pool of spare nodes to protect its investment in the jobs already executing. As noted above, to calculate the optimal number of spare nodes for each job, the optimal job scheduling strategy (160) estimates the probability of job success using a calibrated, rational mathematical model of the likelihood that the number of compute nodes will fail before a job finishes. In one example, the optimal job scheduling strategy (160) calculates if the number of compute nodes that fail before a job finishes will be less than or equal to the number of spare nodes available to the job. The optimal job scheduling strategy (160) process can be done using the examples detailed in FIGS. 2 and 3 described later in this specification.

Thus, each arriving job is optimally assigned to a cluster (110) given reliability factors by allocating a number of compute nodes and a number of spare nodes. The optimal job scheduling strategy (160) allocates compute nodes efficiently and accepts additional jobs as long as the currently allocated jobs would not be put at risk.

Additionally, a system monitoring module (170) monitors the health of each individual node (120-1 to 120-n) and other system components. The system monitoring module (170) tracks parameters that determine the estimated failure probabilities, or reliability factors, of each node (120-1 to 120-n) as well as other system components. The optimal job scheduling strategy (160) uses this information from the system monitoring module (170) to determine the number of compute nodes and the number of spare nodes allocated to each arriving job to maximize throughput. For example, assume a job is assigned to cluster (110-1). Further assume node (120-1) has an estimated failure probability lower than an estimated failure probability node (120-3) for this job as determined by the system monitoring module (170). Thus, based on the parameters for each node (120-1, 120-3), node (120-1) may be used as a compute node and node (120-3) may be used as a spare node as determined by the optimal job scheduling strategy (160).

In one example, assume the optimal job scheduling strategy (160) determines a job will include three compute nodes and one spare node to execute a job. Thus, cluster (110-1) may be used to execute the job. Further, assume the system monitoring module (170) determines, based on each node's (120-1 to 120-4) reliability factors, that nodes (120-1, 120-2, 120-3) have the highest throughput in the cluster (110-1). Thus, nodes (120-1, 120-2, 120-3) are used as compute nodes for executing the job and node (120-4) is used as a spare node. Assume during the execution of the job that node (120-1) fails. Node (120-4) may now be used as a compute node to continue to execute the job. Thus, the job can continue to execute on the HPC system (100).

In another example, assume the optimal job scheduling strategy (160) determines a job will include five compute nodes and two spare node to execute the job. Thus, cluster (110-2) may be used to execute the job. Further, assume the system monitoring module (170) determines, based on each node's (120-5 to 120-n) reliability factors, nodes (120-5 to 120-9) have the highest throughput in the cluster (110-2). Thus, nodes (120-5 to 120-9) are used as compute nodes for executing the job and nodes (120-10, 120-11) are used as spare nodes. Assume during the execution of the job that no compute nodes (120-5 to 120-9) fail. Thus, during the execution of the job, no spare nodes (120-10 and 120-11) will be used.

Thus, the parameters for the reliability factors are determined and adjusted by a system monitoring module (170). Further, the optimal job scheduling strategy (160) is used to allocate a number of compute nodes and a number of spare nodes in a cluster (110) for each arriving job based on the reliability factors.

The job scheduling strategy (160) has a calculation engine (163) and an assigning engine (167). The engines represent the program instructions to carry out their indicated functions. The calculation engine (163) calculates the average time for a checkpoint-restart after a primary node failure. The calculation engine (163) also calculates an optimal checkpoint interval and a AFPR for the multiple nodes, calculates a probability that a spare node is available when desired, and calculates a maximum value of the processor utilization efficiency. The assigning engine (167) assigns an optimal number of spare nodes to a job based on the value of the processor utilization efficiency.

Figure 2:
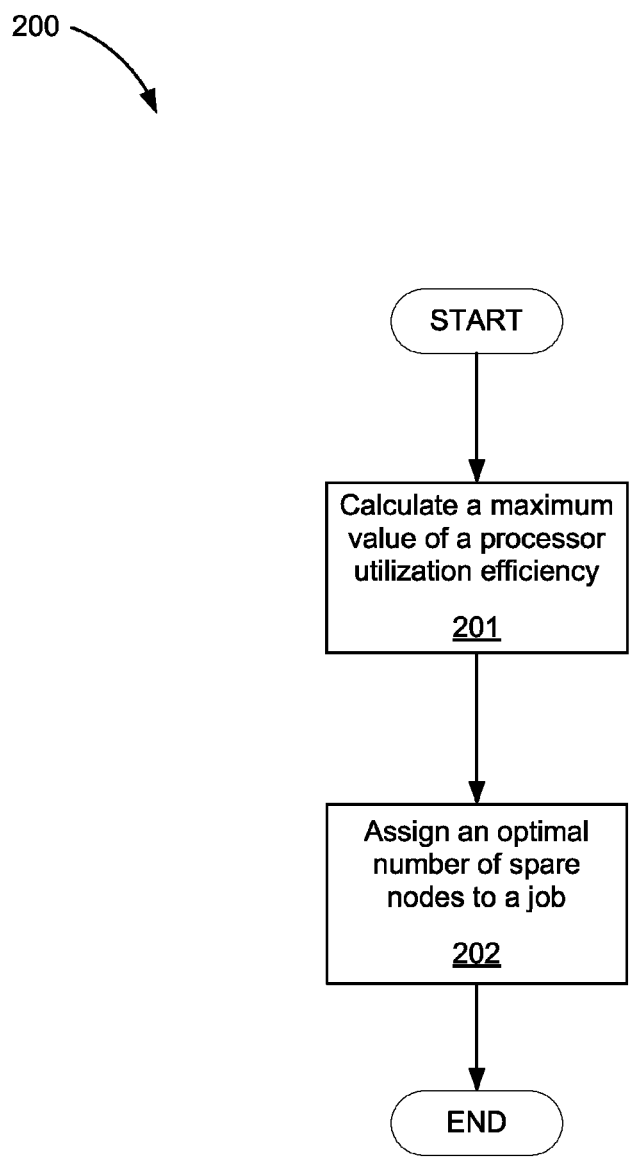
FIG. 2 is a flowchart of an example of a method for an optimal job scheduling strategy, according to the principles described herein.

FIG. 2 is a flowchart of an example of a method for optimal job scheduling strategy, according to the principles described herein. As noted above, the optimal job scheduling strategy (FIG. 1, 160) takes into account the size of the job, the reliability of the compute nodes allocated to the job, the number of spare nodes allocated to the job, the ratio of compute nodes to total nodes assigned to the job, other factors, or combinations thereof. Given these reliability factors, an overall measure of optimality ensures that the best trade-off between job execution forward progress, degree of spare node allocation, and prudent use of total nodes assigned to the job occurs.

As mentioned in FIG. 1, a system monitoring module (FIG. 1, 170) monitors the health of each individual node (FIG. 1, 120), and other system components. The system monitoring module (FIG. 1, 170) adjusts parameters, such as average forward progress ratio (AFPR), and steady state probability that determine the estimated failure probabilities, for each node (FIG. 1, 120) as well as other system components. These estimated failure probabilities are used as reliability factors and are described below. Thus, the optimal job scheduling strategy (FIG. 1, 160) uses this information from the system monitoring module (FIG. 1, 170) to determine the number of compute nodes and the number of spare nodes allocated to each arriving job.

According to certain principles described herein, the optimal job scheduling strategy calculates (201) a maximum value of the processor utilization efficiency. The processor utilization efficiency (PUE) is the overall measure of throughput for each job using a number of compute nodes. In one example, PUE=AFPR×A(i))×P(N), where AFPR is the average forward progress ratio, A(i) is the steady state probability that a spare node is available, and P(N) is the primary node ratio and are described below. Further, the AFPR, the steady state probability that a spare node is available, and a primary node ratio are used as reliability factors to determine an estimated throughput of a node (FIG. 1, 120).

As mentioned above, the PUE uses the AFPR in the overall measure of throughput for each job. The AFPR is the portion of elapsed time that a cluster (FIG. 1, 110) is executing a job when the cluster (FIG. 1, 110) is available. Further, the AFPR presumes sufficient spare nodes are available using Poisson probabilities. Poisson probabilities can be done using the example in FIG. 3 which is described in detail later in the specification. In one example, assume the AFRP is calculated to be 0.9585.

As mentioned above, the PUE uses the steady state probability that a spare node is available in the overall measure of throughput for each job. The steady state probability that a spare node is available may be expressed as A(i). Further, the steady state probability has a number of properties that are presumed to be unchanging in time. Thus, if it is determined a spare node has a certain probability of being available in the past the spare node will have the same probability of being available in the future. In one example, assume the steady state probability that a spare node is available is calculated to be 0.9962.

As mentioned above, the PUE uses the primary node ratio in the overall measure of throughput for each job. The primary node ratio may be expressed as the number of nodes, N(i), assigned to a job divided by the sum of the assigned nodes, N(i), for a job and the number of spare nodes, S(i). In one example, assume the primary node ration is calculated to be 0.8369.

In keeping with the given example, PUE=0.9580×0.9962× 0.8369. Thus, the PUE has an estimated efficiency of 84% using the reliability factors to process a job in the cluster (FIG. 1, 120).

Given these reliability factors, the optimal job scheduling strategy assigns (202) an optimal number of spare nodes to the job. As noted above, if a compute node fails, a spare node resumes execution of the job. Thus, the batch system (FIG. 1, 130) maintains an adequate number of spare nodes to protect the investment in the jobs currently executing on the compute nodes. Further, the optimal job scheduling strategy's (FIG. 1, 160) assigning of spare nodes is subject to the restriction that total node count has not been exceeded in order to advance the next job request.

Thus, the optimal job scheduling strategy (FIG. 1, 160) takes into account reliability of each the underlying nodes where jobs will execute and the number of spare nodes allocated to the job. Consequently, this allows maximum job throughput of the HPC system (FIG. 1, 100).

Figure 3:
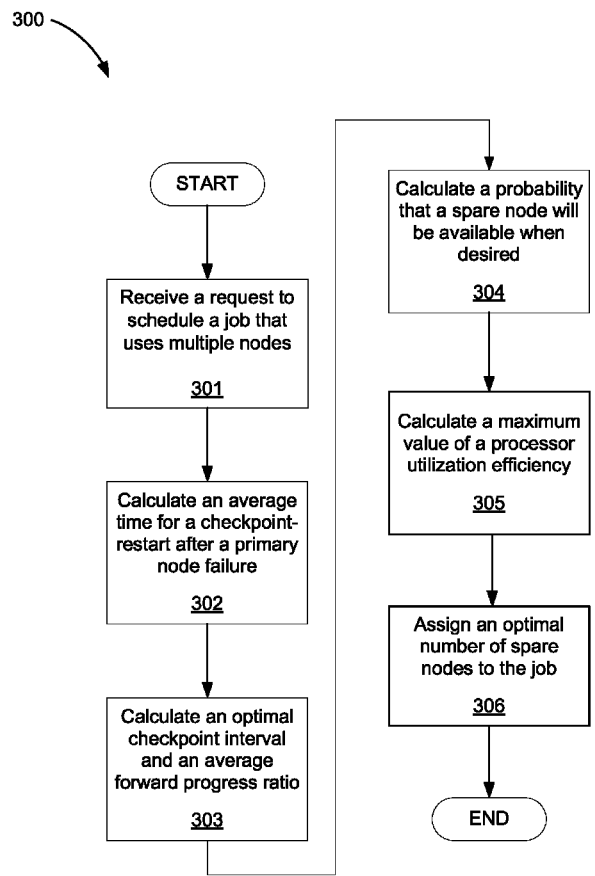
FIG. 3 is a flowchart of an example of a method for an optimal job scheduling strategy, according to principles described herein.

FIG. 3 is a flowchart of an example of a method for optimal job scheduling strategy, according to principles described herein. As noted above, the optimal job scheduling strategy (FIG. 1, 160) uses a number of throughput estimates to maximize throughput for a number of jobs. Further, throughput estimates can be based on reliability factors for system components where jobs are executed, such as nodes (FIG. 1, 120). As noted above, the parameters for reliability factors can be adjusted based on a system monitoring module (FIG. 1, 170). The system monitoring module (FIG. 1, 170) monitors the health of individual nodes, and other system components. The system monitoring module (FIG. 1, 170) adjusts the parameters for each node and other system components to determine the estimated failure probabilities of nodes as well as other system components as will be described below. The optimal job scheduling strategy (FIG. 1, 160) uses these parameters as reliability factors when scheduling a job to assign an optimal number of spare nodes to the job.

According to certain principles described herein, the method includes receiving (301) a request to schedule a job that uses multiple nodes. As noted above, each job requires a number of nodes (FIG. 1, 120) to execute the job depending on the size of the job. Each of the jobs arriving is optimally assigned to a cluster (FIG. 1, 110) by allocating a number of compute nodes and can accept additional jobs as long as the current allocated jobs are not put at risk.

Next, the optimal job scheduling strategy calculates (302) an average time for a checkpoint-restart after a primary node failure. Checkpoint-restart uses two processes, namely creating a checkpoint and restarting a node to the created checkpoint if the node fails. The combination of the checkpoint and restart process may be referred to checkpoint-restart. Further, a checkpoint is used to improve the progress of jobs in the HPC system. Checkpoint is a technique for inserting fault tolerances into an HPC system that helps tolerate errors, such as node failure, that lead to losing the work of long-running jobs. The checkpoint technique preserves system consistency in case of a node failure. For example, a checkpoint is inserted after a specified interval of time, periodically or after a specified event by writing the HPC system's current state, or data, into memory. The HPC system's current state may be saved in memory either locally, in stable storage, or in a distant node's memory. Thus, checkpoint is the process of writing an HPC system's current state, or data, into memory. Further, the checkpoint can be read from memory even after a subsequent failure happens, such as a node failure.

Thus, checkpoints are used to save the current state of an HPC system. Further, the checkpoint can be read from memory even after a subsequent failure happens, such as a node failure. If a node failure occurs, the job executing on the node stops. Thus, the progress of jobs in the HPC system will be impacted. In order for the job to progress, the failed node is restarted. When the failed node restarts, the node reads the data stored in the last of the periodic checkpoints, and resumes the executing of the job from the point at which that checkpoint was inserted. Thus, the work done on the job, before the checkpoint, is not reprocessed. Consequently, the work done on the job between taking the checkpoint and the node failure is lost. Thus, a restart is used to restore the state of an HPC system, to where the checkpoint was inserted, in the event of node failure. Thus, the optimal job scheduling strategy calculates (302) an average time desired for a checkpoint-restart after a primary node failure. By using a checkpoint-restart, a PUE will be optimized in the event of node failure as will be described below. Further, if checkpoints are not used, and a node fails, the job is lost and is reprocessed.

Further, the average time for a checkpoint-restart after a primary node failure is calculated (302) using a Markov chain. A Markov chain is a mathematical system that transitions from one state of a system to another state of the system between a finite number of possible states. In one example, this process is random where the next state depends just on the current state and not the sequence of events that preceded it. The Markov chain may be used to calculate (302) the average time for a checkpoint-restart after a primary node failure.

Next, the optimal job scheduling strategy calculates (303) an optimal checkpoint interval and an average forward progress ratio. A checkpoint interval may be defined as the time desired to complete a synchronous global checkpoint operation to maximize the AFPR. As mentioned above, a checkpoint-restart is used to restore the state of a failed node, using a spare node, to the failed node's previous state where the checkpoint was inserted. In one example, the optimal checkpoint interval is determined to maximize the AFPR before a job is executed on a node. In another example, the optimal checkpoint interval is determined to maximize the AFPR after a job has finished executing on a node. In yet another example, the optimal checkpoint is determined to maximize the AFPR after a specified amount of time. Thus, the optimal checkpoint interval may be periodical.

As noted in FIG. 2, the AFPR is the portion of elapsed time that a cluster (FIG. 1, 110) is executing a job when the cluster (FIG. 1, 110) is available. Further, the AFPR presumes sufficient spare nodes are available using Poisson probabilities. Poisson probabilities are derived from a discrete probability distribution that expresses the probability of a given number of events occurring in a fixed interval of time with an average rate since the last event. In one example, Poisson probabilities are used as weights applied to the AFPR values across the range of node failure counts that might occur during a checkpoint interval time period. The Poisson probabilities method and technique are beyond the scope of this specification. However, the Poisson probabilities may be used to calculate (303) an optimal checkpoint interval and an average forward progress ratio.

Next, the optimal job scheduling strategy calculates (304) a probability that a spare node will be available when desired. Further, as noted in FIG. 2, the probability that a spare node will be available when desired may be based on a steady state probability. The steady state probability has a number of properties that are presumed to be unchanging in time. Thus, if it is determined a spare node has a certain probability of being available in the past the spare node will have the same probability of being available in the future. Further, the steady state probability that a spare node is available may be expressed as A(i). As noted above, if a node fails, a job may crash losing all the work done to that point unless a spare node can be provided. Thus, spare nodes are used if a node fails to prevent a job from crashing. In one example, assume a node is used for executing a job. Further, assume a checkpoint has been made on the node. Assume after an amount of time, the node fails. Thus, a spare node is used to resume executing the job while the failed node restarts from its last checkpoint. Further, using a spare node impacts a PUE of the optimal job scheduling strategy.

Next, the optimal job scheduling strategy calculates (305) a maximum value of the processor utilization efficiency. As described in connection with FIG. 2, the PUE is the overall measure of throughput for each job using a number of compute nodes. Further, PUE is the product of AFRP (303), the steady state probability that a spare node is available (304), and a primary node ratio. As noted in FIG. 2, the primary node ratio may be expressed as the number of the desired nodes, N(i), for a job divided by the sum of the desired nodes, N(i), for a job and the number of spare nodes, S(i). Thus PUE=AFPR×A(i)×(N(i)/(N(i)+S(i))).

Given these reliability factors, the optimal job scheduling strategy assigns (306) an optimal number of spare nodes to the job. If a compute node fails, a spare node resumes execution of the job and the failed node restarts from its last checkpoint. Further, the optimal job scheduling strategy's (FIG. 1, 160) assigning of spare nodes is subject to the restriction that total node count has not been exceeded to advance the next job request. Thus, the optimal job scheduling strategy (FIG. 1, 160) maintains an adequate number of spare nodes to protect the investment in the jobs currently executing on the compute nodes.

Thus, the optimal job scheduling strategy (FIG. 1, 160) takes into account reliability factors of each the underlying nodes where jobs will execute and the number of spare nodes allocated to the job. Consequently, this allows maximum job throughput of the HPC system (FIG. 1, 100).

Figure 4:
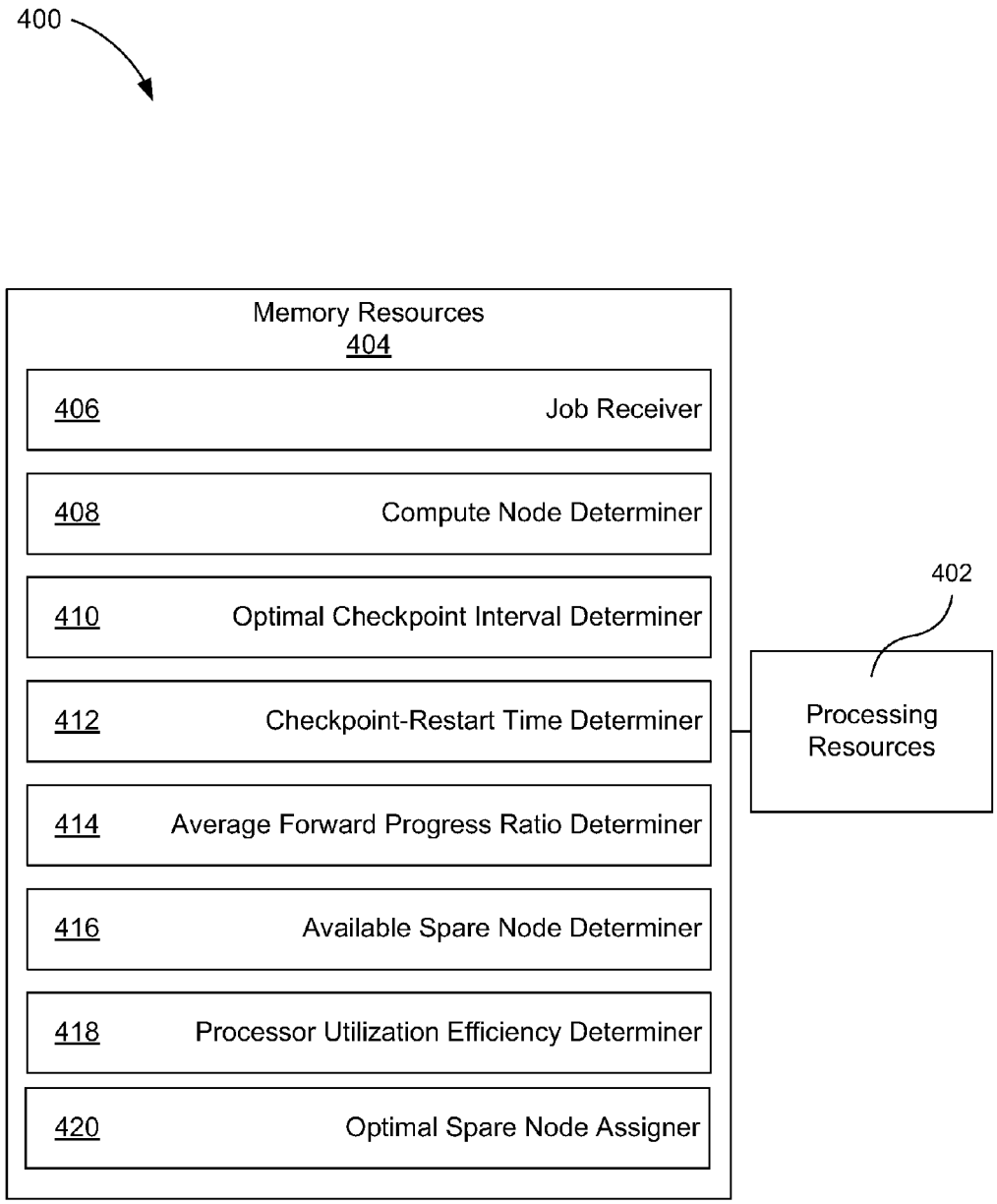
FIG. 4 is a diagram of an example of an optimal job scheduling strategy system, according to principles described herein.

FIG. 4 is a diagram of an example of an optimal job scheduling strategy system (400) according to principles described herein. In this example, the optimal job scheduling strategy system (400) includes processing resources (402) that are in communication with memory resources (404). Processing resources (402) include at least one processor and other resources used to process programmed instructions. The memory resources (404) represent generally any memory capable of storing data such as programmed instructions or data structures used by the optimal job scheduling strategy system (400). The programmed instructions shown stored in the memory resources (404) include a job receiver (406), a compute node determiner (408), an optimal checkpoint interval determiner (410), a checkpoint-restart time determiner (412), an average forward progress ratio determiner (414), an available spare node determiner (416), a processor utilization efficiency determiner (418), and an optimal spare node assigner (420).

The memory resources (404) include a computer readable storage medium that contains computer readable program code to cause tasks to be executed by the processing resources (402). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The job receiver (406) represents programmed instructions that, when executed, cause the processing resources (402) to receive a job. The compute node determiner (408) represents programmed instructions that, when executed, cause the processing resources (402) to determine the number of nodes used in the job based on the size of the job. The optimal checkpoint interval determiner (410) represents programmed instructions that, when executed, cause the processing resources (402) to determine the average time used to replace a failed compute node with a spare node. The checkpoint-restart time determiner (412) represents programmed instructions that, when executed, cause the processing resources (402) to determine an optimal time at the completion of a checkpoint-restart that maximizes an AFPR. The average forward progress ratio determiner (414) represents programmed instructions that, when executed, cause the processing resources (402) to determine the proportion of elapsed time that a cluster is executing a job. The available spare node determiner (416) represents programmed instructions that, when executed, cause the processing resources (402) to determine if a node in a cluster is executing a job or if the node in the cluster is using a checkpoint-restart to recover to a spare node. The processor utilization efficiency determiner (418) represents programmed instructions that, when executed, cause the processing resources (402) to determine the throughput delivered by a cluster of nodes for a job. The optimal spare node assigner (420) represents programmed instructions that, when executed, cause the processing resources (402) to assign an optimal number of spare nodes to a job.

Further, the memory resources (404) may be part of an installation package. In response to installing the installation package, the programmed instructions of the memory resources (404) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (402) and the memory resources (404) are located within the same physical component, such as a server, or a network component. The memory resources (404) may be part of the physical component's main memory, caches, registers, non-volatile memory, or elsewhere in the physical component's memory hierarchy. Alternatively, the memory resources (404) may be in communication with the processing resources (402) over a network. Further, the data structures, such as the libraries, may be accessed from a remote location over a network connection while the programmed instructions are located locally. Thus, the recommendation system (400) may be implemented on a user device, on a server, on a collection of servers, or combinations thereof.

The optimal job scheduling strategy system (400) of FIG. 4 may be part of a general purpose computer. However, in alternative examples, the optimal job scheduling strategy system (400) is part of an application specific integrated circuit.

The preceding description has been presented to illustrate and describe examples of the principles described. This description is not intended to be exhaustive or to limit these principles to any precise form. Many modifications and variations are possible in light of the above teaching.

What is claimed is:

1. A method for assigning nodes to jobs based on reliability factors, comprising:
   calculating a maximum value of a processor utilization efficiency; and
   assigning an optimal number of spare nodes to a job based on said maximum value of said processor utilization efficiency.

2. The method of claim 1, wherein calculating the maximum value of the processor utilization efficiency includes taking into account an average forward progress ratio (AFPR).

3. The method of claim 1, wherein calculating the maximum value of the processor utilization efficiency includes taking into account a probability that a healthy node of said spare nodes is available if a compute node fails.

4. The method of claim 1, wherein calculating the maximum value of the processor utilization efficiency includes taking into account a primary node ratio.

5. A system for assigning nodes to jobs based on reliability factors, the system comprising:
   a calculation engine to:
      calculate the average time for a checkpoint-restart after a primary node failure;
      calculate an optimal checkpoint interval and an AFPR for said multiple nodes;
      calculate a probability that a spare node is available when desired;
      calculate a maximum value of the processor utilization efficiency; and
   an assigning engine to assign an optimal number of spare nodes to said job based on said value of the processor utilization efficiency.

6. The system of claim 5, wherein said system further comprises a system monitoring module to track parameters of multiple nodes to determine estimated failure probabilities of said multiple nodes.

7. The system of claim 6, wherein said estimated failure probabilities of said multiple nodes are used as reliability factors.

8. The system of claim 7, wherein said reliability factors are used to calculate said maximum value of said processor utilization efficiency.

9. The system of claim 5, wherein the assigning engine is to allocate multiple compute nodes for each job as determined by a size of each said job.

10. The system of claim 9, wherein the assigning engine is to determine reliability estimates of each of said multiple compute nodes.

11. The system of claim 5, wherein to calculate said maximum value of said processor utilization efficiency includes to consider recovery characteristics of each said node.

12. A computer program product for assigning nodes to jobs based on reliability factors, comprising:
   a non-transitory computer readable storage medium, said non-transitory computer readable storage medium comprising computer readable program code embodied therewith, said computer readable program code comprising program instructions that, when executed, causes a processor to:
      receive a request to schedule a job that uses multiple nodes;
      calculate a maximum value of a processor utilization efficiency; and assign an optimal number of spare nodes to a job based on said maximum value of said processor utilization efficiency.

13. The computer program product of claim 12, further comprising computer readable program code comprising program instructions that, when executed, cause said processor to calculate an average forward progress ratio (AFPR).

14. The computer program product of claim 12, further comprising computer readable program code comprising program instructions that, when executed, cause said processor to calculate a probability that a healthy node of said spare nodes is available if a compute node fails.

15. The computer program product of claim 12, further comprising computer readable program code comprising program instructions that, when executed, cause said processor to calculate a primary node ratio.

* * * * *